Aumont

[11] 3,753,101
[45] Aug. 14, 1973

[54] FARADAY EFFECT CURRENT MEASURING DEVICE

[75] Inventor: Pierre Aumont, Aix-Les-Bains, France

[73] Assignee: Alstom-Savoisienne, Saint-Quen, France

[22] Filed: July 5, 1972

[21] Appl. No.: 268,978

[30] Foreign Application Priority Data
July 5, 1971 France .................................. 7124571

[52] U.S. Cl. ................. 324/96, 250/220 R, 250/225
[51] Int. Cl. ............................................... G01r 31/00
[58] Field of Search ....................... 324/96; 250/225, 250/220 R, 229

[56] References Cited
UNITED STATES PATENTS

| | | |
|---|---|---|
| 3,419,802 | 12/1968 | Pelenc et al. ..................... 250/225 X |
| 3,659,111 | 4/1972 | Weaver et al. ................... 250/220 R |
| 3,679,974 | 7/1972 | Mollenbeck ........................... 324/96 |
| 3,708,747 | 1/1973 | Lesueur .......................... 250/225 X |

OTHER PUBLICATIONS

Friedman, Magneto–Optic Shutter, IBM Tech. Disclosure Bulletin, Vol. 8, No. 1, 6/65, p. 120.

*Primary Examiner*—Walter Stolwein
*Attorney*—Richard C. Sughrue, John H. Mion et al.

[57] ABSTRACT

Faraday effect current measuring devices having two optical paths characterized in that a single photoelectric cell may be used for the two optical paths. Liquid crystal sheets, in the two optical paths, are rendered alternately transparent and opaque at a very high frequency by an electric field controlled by a modulator. As a result, a synchronized detector coupled to the output of the photoelectric cell separates the signals from the two optical paths.

2 Claims, 1 Drawing Figure

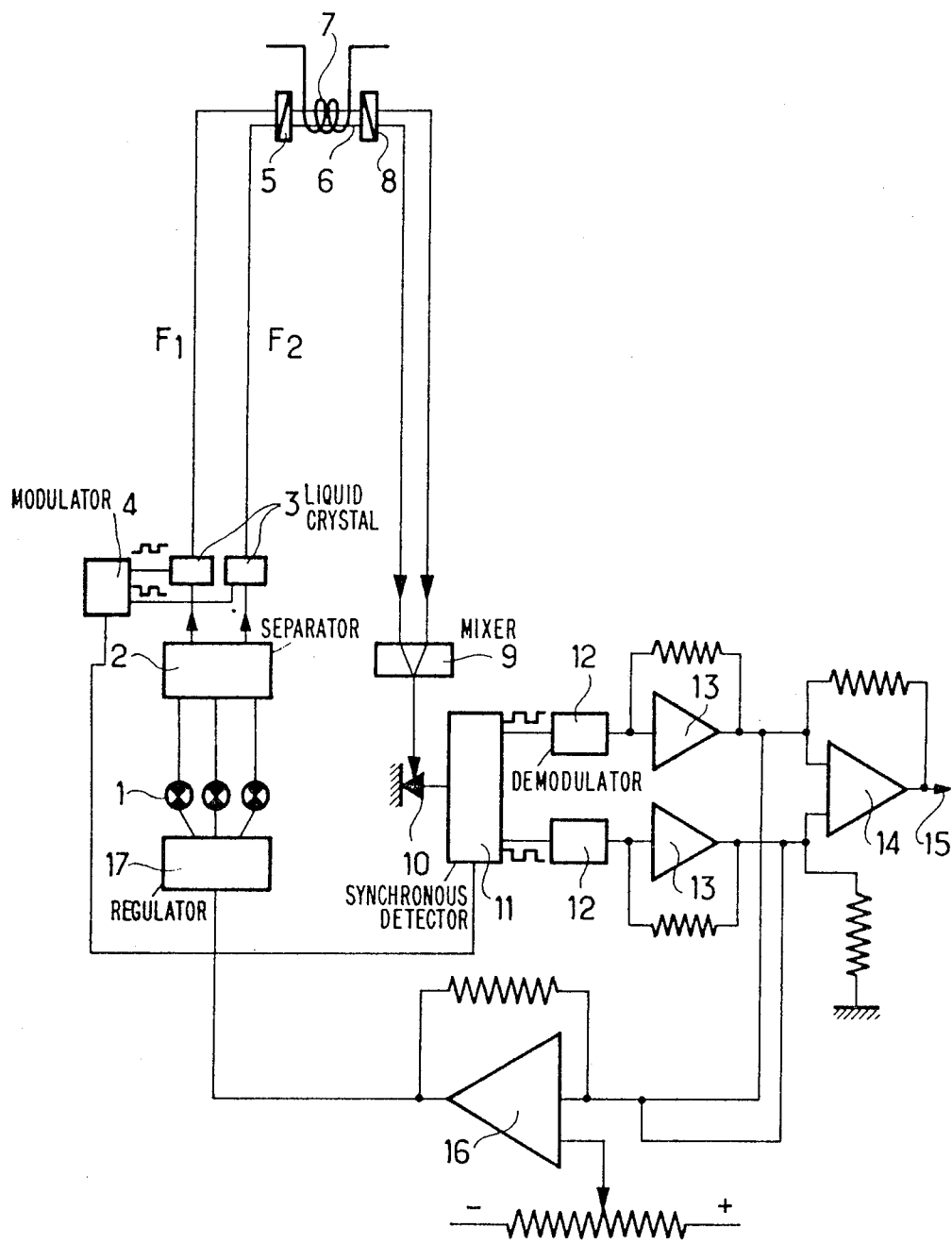

FARADAY EFFECT CURRENT MEASURING DEVICE

BACKGROUND OF THE INVENTION

1. Field of the Invention

The invention relates to Faraday effect current measuring devices and more particularly current measuring devices in which the light emitted by a light source passes, in two optical paths, over at least one polarizer and one Faraday effect rotator subjected to a magnetic field produced by the current being measured. The light then strikes two analyzers, one per optical path, before falling onto a photosensitive means, the output of which allows the signals received to be compared. Thus the compared signals are a function of the current producing the magnetic field. Furthermore, the addition of the signals provides a possible control signal for a device for compensating for the variations in the characteristics of the light circuit.

2. Description of the Prior Art

These two optical paths may, for example, include analyzers whose analysis plane is at 45° on either side of a single polarization plane and two Faraday effect rotators rotating the two light bundles in opposite directions, or a single rotator for the two paths producing an identical rotation in the two light bundles.

In the embodiments which have already been proposed, these types of Faraday effect current measuring devices have the disadvantage of using two photoelectric cells which are chosen so as to be as similar as possible; however, the differences may exceed the precision margin allowed by current standards for measuring current intensities.

SUMMARY OF THE INVENTION

According to the present invention, it has been found that it is possible to use a single photoelectric cell for the two optical paths by placing in these paths, liquid crystal sheets rendered alternately transparent and opaque at a very high frequency. The opacity and transparency of the two sheets are out of phase with the other. The signals are sampled selectively from the two optical paths by means of a synchronized detector controlled at the same frequency as the liquid crystal sheets.

Liquid crystals are organic compounds in which the fusion process takes place in a plurality of stages causing the appearance of intermediate bodies between the solid and liquid state. Thus, when one of these bodies is heated in the solid state, a first fusion is obtained at a temperature at which the body becomes sticky and diffused. By continuing to heat the body, a second fusion temperature will be observed, above which the body is perfectly liquid and clear. Between these two temperatures, the body has properties belonging both to the solid and the liquid phase. Hence, the name liquid crystal.

Liquid crystals are divided into three classes:

nematic crystals, the molecules of which have an axis parallel to a given direction, smectic crystals, the elongated molecules of which are arranged in parallel layers which may slide over one another, and cholesteric crystals, which are related to the two preceding types of crystals. The cholesteric crystal molecules are arranged in parallel layers in which they are parallel to a given direction, while the direction of the molecules turns at a constant angle from one layer to the other, thus giving the crystals a helical structure.

Two types of phenomena may be observed when a nematic crystal is subjected to an electric field. The crystal either becomes opaque as soon as the electric field is applied and becomes transparent when this field is removed, or the crystal does not become naturally opaque but becomes a bright blue color if it is mixed with certain colorants. This color is also associated with the presence of an electric field.

In the case of the two other types of liquid crystals, the application of an electric field modifies the wavelength of the light transmitted by the crystal. Thus if a suitable monochromatic light is used, selected in dependence on the crystal, the application of an electric field eliminates the transmission of light by the crystal, and transmission is restored after the electric field has been removed.

The object of the invention is to provide a current measuring device, comprising a light source, a separator for separating the light from the source into two light bundles, and two optical paths disposed in parallel for these light bundles. Each optical path includes a polarizer, a Faraday effect rotator subjected to a magnetic field produced by the current to be measured, and a sheet of liquid crystals. A photosensitive means receives the light bundles from the optical paths and an electric circuit compares the signals emitted by said photosensitive means in response to each of the two light bundles in order to obtain an indication of the current to be measured. The two sheets of liquid crystals are subjected to electric fields produced by pulses provided by a moldulator. The pulses are at the same frequency for the two sheets but are out of phase so that one sheet is alternately opaque and transparent when the other sheet is transparent and opaque. The photosensitive means comprises a single photoelectric cell receiving the two light bundles. A synchronized electric detector, which is synchronized with the modulator, separates the signals from one or other of the two optical paths. The detector is connected between the photoelectric cell and the electric comparison circuit. The synchronized electric detector is followed by the modulators.

Preferably, nematic crystals are used.

BRIEF DESCRIPTION OF THE DRAWING

The FIGURE is a block diagram of the preferred embodiment of the present invention.

DESCRIPTION OF THE PREFERRED EMBODIMENT

A light source 1, which may be monochromatic, and which comprises a single elementary source or a plurality of elementary sources, emits a light bundle which passes into an optical mixer-separator 2 where it is separated into two bundles $F_1$ and $F_2$, by known means such as, for example, optical fibers.

Each bundles crosses a sheet 3 of nematic liquid crystal which are subjected to electric field pulses produced by a modulator 4, which may be a simple flip-flop. The frequency of these pulses is high so as to be compatible with the desired precision. This frequency is, for example, between 30 and 50 KHz. The electric field pulses applied to the two sheets 3 are at the same frequency but are out of phase so that one sheet is opaque while the other is transparent and the pulse length is such that the two sheets are never transparent at the same time. Each bundle $F_1$ or $F_2$ follows a separate path to avoid any interaction. The bundles pass through an electrified zone including a polarizer 5 attached to the input surface of a Faraday effect rotator 6. A winding 7 applies the current from a high voltage electric line. The bundles $F_1$ and $F_2$ cross the rotator 6 which may be provided with reflection devices allowing several crossings, and then pass into an analyzer 8. The axes of the two analyzers 8 are symmetrical with respect to the axis of the polarizer 5. The angle between the axis of an analyzer and that of a polarizer is preferably 45°.

The bundles $F_1$ and $F_2$ follow an optical guide and pass into a mixer 9 where they are mixed prior to striking a single detector cell 10.

The output signal of the cell 10 is a pulsed signal, having a frequency which is double the modulation frequency of the electric field in the modulator 4 and of which the instantaneous value of the current is variable during the pulsed period. The current of the signal from one of the optical paths is as follows:

$$I_1 = A \cos^2 (\Pi/4 - \theta)$$

and the current of the signal from the other optical path is in the form:

$$I_2 = A \cos^2 (\Pi/4 + \theta)$$

A is the transmission of the measurement path, and $\theta$ is the Faraday angle of rotation.

The output signal of the cell 10 is applied to a synchronized detector 11, of a known type, synchronized with the modulator 4, which separates the signal from one optical path from the signal from the other optical path. These signals then pass into the demodulator 12 before being processed by well known methods to obtain, after amplification in the amplifiers 13, the difference in the signals:

$$I_1 - I_2 = A \sin 2\theta$$

An amplifier 14 produces an output 15 which is indicative of the current to be measured, or the sum of the signals $$I_1 + I_2 = 2A$$

The output of an amplifier 16 acts on the feed 17 of the light source 1, to regulate the light flow according to the variations in the characteristics of the light circuit and of the cell 10 with respect to time or temperature. This avoids strict regulation of the temperature of the cell 10. The overall deviation is thus due to the single deviation of the amplifier and this can be reduced.

The electric modulation at 4 has the advantage of only consuming power and not being limited in frequency by the components having significant time constants.

While the invention has been particularly shown and described with reference to the preferred embodiment thereof, it will be understood by those skilled in the art that various changes in form and details may be made therein without departing from the spirit and scope of the invention.

I claim:

1. In a current measuring device comprising a light source; a separator means for dividing the light emitted by said source into two light bundles; two optical paths disposed in parallel for said light bundles, each optical path comprising polarizer means, a Faraday effect rotator means subjected to a magnetic field produced by the current to be measured, and an analyzer means; photosensitive means for receiving the light bundles from said two optical paths and electrical circuit means for comparing the signals emitted by said photosensitive means in response to said light bundles; the improvement comprising a sheet of liquid crystal in each of said optical paths; and modulator means, connected to said liquid crystal sheets, for producing two pulse trains at the same frequency but out of phase with each other whereby the electric fields produced by said pulses cyclically change said liquid crystal sheets between transparent and opaque states such that only one of said liquid crystal sheets is in a transparent state at a time; and wherein said photosensitive means comprises a single photoelectric cell for receiving said two light bundles and a synchronized detector means, coupled between said photoelectric cell and said electric circuit means, synchronized with said modulator, for separating the signals from said photoelectric cell corresponding to said two bundles, whereby the light bundles striking said photocell are a function of the output of said Faraday effect rotator means, the output of said Faraday effect rotator means being a function of the current causing the magnetic field which is the current to be measured.

2. The current measuring device according to claim 1 wherein said sheets of liquid crystals comprise nematic crystals.

* * * * *